United States Patent [19]

Foster

[11] Patent Number: 5,415,271

[45] Date of Patent: May 16, 1995

[54] RECIPROCATING FLOOR CONVEYOR WITH OVERLAY, PROTECTIVE PLATE

[76] Inventor: Raymond K. Foster, P.O. Box 1, Madras, Oreg. 97741

[21] Appl. No.: 304,404

[22] Filed: Sep. 12, 1994

[51] Int. Cl.$^6$ ............................................. B65G 25/04
[52] U.S. Cl. ................................................. 198/750.3
[58] Field of Search ...................... 198/750; 414/525.1, 414/525.9

[56] References Cited

U.S. PATENT DOCUMENTS

| | | | |
|---|---|---|---|
| 4,712,467 | 12/1987 | Foster | 91/176 |
| 4,785,929 | 11/1988 | Foster | 198/750 |
| 4,793,469 | 12/1988 | Foster | 198/750 |
| 4,962,848 | 10/1990 | Foster | 198/750 |
| 5,064,052 | 11/1991 | Foster | 198/750 |
| 5,088,595 | 2/1992 | Hallstrom, Jr. | 198/750 |
| 5,263,573 | 11/1993 | Hallstrom, Jr. | 198/750 |
| 5,267,641 | 12/1993 | Hallstrom, Jr. | 198/750 |
| 5,355,994 | 10/1994 | Foster | 198/750 |

*Primary Examiner*—D. Glenn Dayoan
*Attorney, Agent, or Firm*—David P. Campbell

[57] ABSTRACT

A reciprocating floor conveyor (10) having a plurality of elongated conveyor slats (12) mounted on a conveyor frame (14) for longitudinal reciprocating movement between "start" and "advanced" positions, the conveyor slats (12) each including an overlay plate (60) mounted on top. Each overlay plate (60) has a first side edge portion (64) and a second side edge portion (66). The first side edge portion terminates laterally at a first side edge (68), and the second side edge portion terminates at a second side edge (67). Each overlay plate (60) includes a central portion (62) defined between its first and second side edge portions. The first side edge portion of each overlay plate is angled upwardly so that the first side edge (68) is above the central portion (62), and the second side edge portion (66) extends upwardly over the first side edge portion (64) of the overlay plate (60) mounted on an adjacent conveyor slat (12). A seal (78) is mounted between the second side edge portion (66) of each overlay plate (60) and the first side edge portion (64) of an adjacent overlay plate.

7 Claims, 3 Drawing Sheets

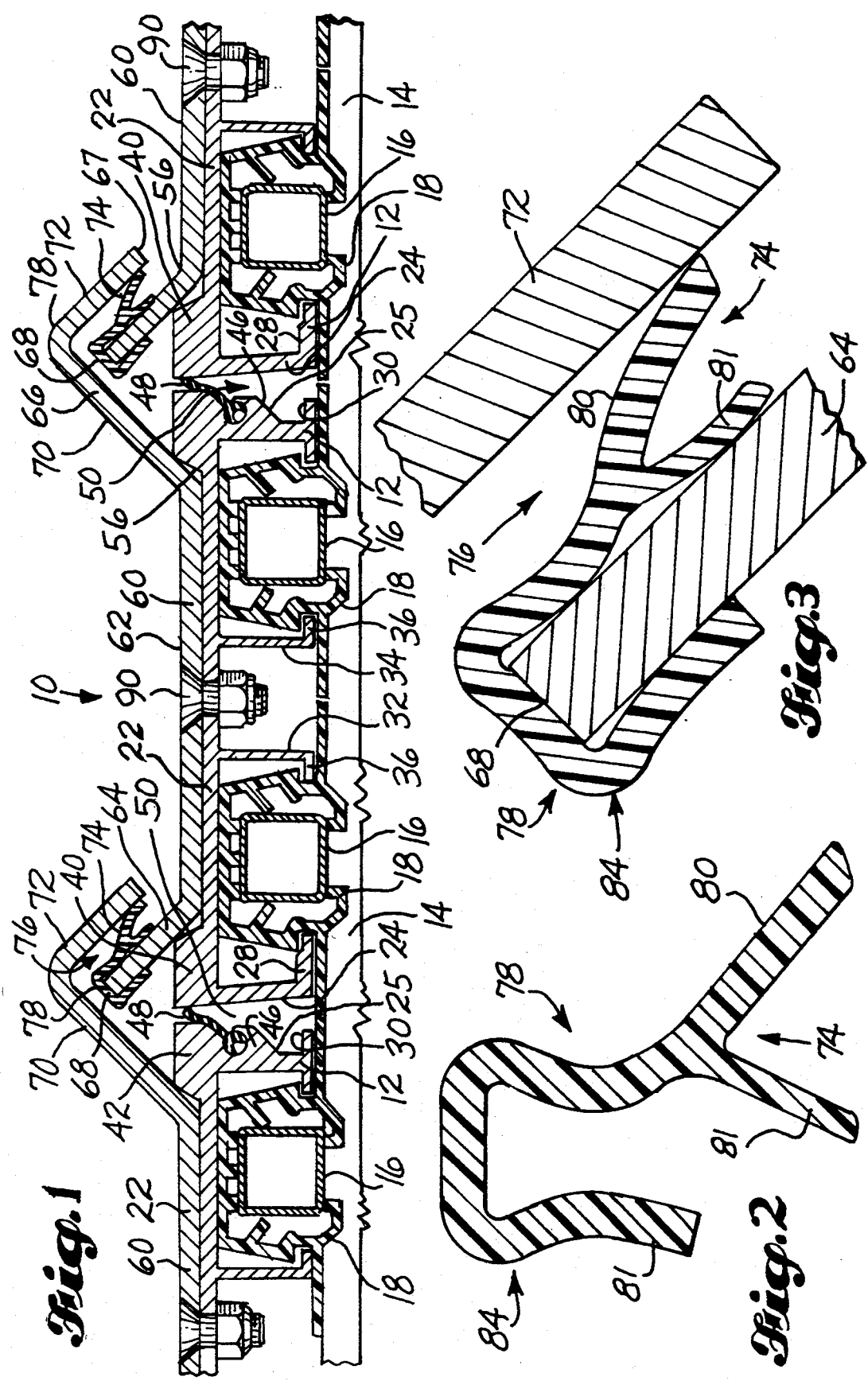

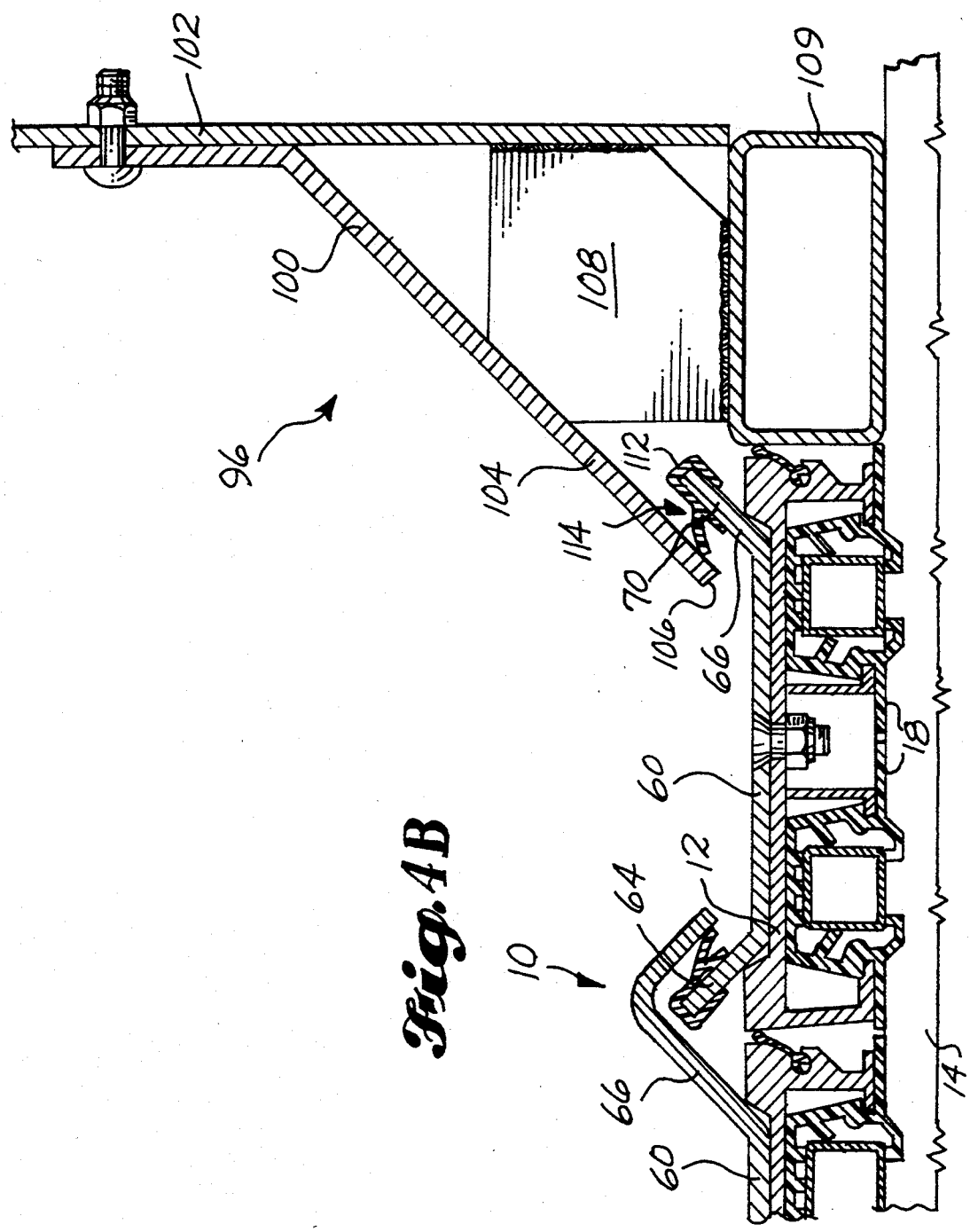

RECIPROCATING FLOOR CONVEYOR WITH OVERLAY, PROTECTIVE PLATE

TECHNICAL FIELD

The present invention pertains to improvements in reciprocating floor conveyors. More particularly, it pertains to an improved protective layer and seal design over the floor conveyor slats for protecting the slats and preventing material from getting into gaps between adjacent conveyor slats.

BACKGROUND OF THE INVENTION

Reciprocating floor conveyors often are used to convey bulk material, such as garbage, wood chips, gravel, ice, etc. Certain types of bulk material (e.g., garbage) can be abrasive to the conveyor slats of the reciprocating floor conveyor. Abrasive bulk material not only can cause damage to the top surfaces of the conveyor slats, but can also work its way down into the gaps between adjacent conveyor slats where it can cause damage to seals between the slats and to the bearings and sub-framework of the reciprocating floor conveyor.

Attempts have been made to alleviate this problem by providing extra protection for the upper surfaces of the conveyor slats, as well as extra protection for the gaps between the conveyor slats. My patent application Ser. No. 08/153,366, titled, "Replaceable Wear Surface for Conveyor Slats," filed Nov. 16, 1993 now U.S. Pat. No. 5,355,994, and my co-pending patent application Ser. No. 271,483, filed Jul. 7, 1994, and titled, "Snap-In Conveyor Slat Wear Plate," disclose possible solutions to the above-described problems. As disclosed by these patent applications, a wear plate is secured on top of each conveyor slat. Each wear plate includes an upwardly and outwardly-projecting cover flange, which extends laterally outwardly over a portion of an adjacent conveyor slat and over the gap between the adjacent conveyor slats. It has been discovered that some types of abrasive, gritty material can work its way up underneath the cover flange and ultimately into the gaps between the conveyor slats.

It is an object of the present invention to provide improved protection for conveyor slats of reciprocating floor conveyors in order to reduce the foregoing discussed problems.

SUMMARY OF THE INVENTION

Briefly described, the reciprocating floor conveyor of the present invention includes a plurality of elongated conveyor slats mounted on a conveyor frame for longitudinal reciprocating movement between "start" and "advanced" positions. An overlay plate is mounted on top of each conveyor slat. According to an aspect of the invention, each overlay plate has a first and second side edge portion that terminates laterally at first and second side edges, respectively. Each overlay plate also includes a central portion between its side edge portions. The first side edge portion of each overlay plate is angled upwardly so that the first side edge of the plate is above the central portion of the plate. The second side edge portion extends upwardly over the first side edge portion of the overlay plate mounted on an adjacent conveyor slat. According to an aspect of the invention, an overlay seal is mounted between the second side edge portion of each overlay plate and the first side edge portion of an adjacent overlay plate.

According to an aspect of the invention, each overlay seal includes a first portion biased against the second side edge portion of an overlay plate, and a second portion biased against the first side edge portion of an adjacent overlay plate.

According to another aspect of the invention, each overlay seal is secured to the first side edge portion of each overlay plate, preferably by means of a rivet or similar type of mechanical fastener.

According to another aspect of the invention, the second side edge portion of each overlay plate includes a downwardly-angled segment spaced from and confronting the upwardly-angled first side edge portion of an adjacent overlay plate. The juxtaposition of the adjacent upwardly and downwardly-angled edge portions creates a downwardly-disposed gap, or passageway. The overlay seal is positioned in this passageway. The downward inclination of this passageway further reduces passage of material past the overlay seal by requiring material to work its way upwardly past the overlay seal.

According to another aspect of this invention, side seal plates are provided at the outward side edges of the reciprocating floor conveyor. Each side seal plate extends from a sidewall of the reciprocating floor conveyor downwardly and inwardly of the sidewall. Each side seal plate includes an inner lower edge, which overlies a first or second side edge portion of the overlay plates mounted on top of the outermost conveyor slats. A side seal is located between the inner lower edge of each side seal plate and the first or second side edge portions of the overlay plates mounted on top of the outermost conveyor slats. The juxtaposition of the inner lower edges of the side seal plates and the side edge portions of the overlay plates creates a downwardly-inclined passageway in which the side seal is mounted. This downwardly-disposed passageway further reduces the passage of material past the side seal in a manner similar to that of the overlay seals.

Accordingly, a layer of additional protection is provided over the conveyor slats consisting of overlay plates mounted on top of each conveyor slat and side seal plates mounted between the outermost conveyor slats and the sidewalls of the reciprocating floor conveyor. This additional layer of protection also includes downwardly-disposed gaps or passageways between the adjacent overlay plates and side seal plates with seals positioned in such passageways. For material to get past the side seals and overlay seals, the material must move upwardly past the seals. This design provides an improved measure of protection for the conveyor slats, which has been found to reduce substantially the amount of wear and tear on the conveyor slats.

These and other advantages and features will become apparent from the following detailed description of the best mode for carrying out the invention and the accompanying drawings, and the claims, which are incorporated herein as part of the disclosure of the invention.

BRIEF DESCRIPTION OF THE DRAWINGS

In the figures, like reference numerals refer to like parts throughout the several views, wherein:

FIG. 1 is a sectional view of a portion of the reciprocating floor conveyor of the present invention;

FIG. 2 is an enlarged detailed view of an overlay seal and/or a side seal;

FIG. 3 is a detailed, fragmentary view of an overlay seal and/or side seal positioned between either the side edges of adjacent wear plates, or the lower inner edge of a side seal plate and a side edge of an adjacent wear plate; and FIGS. 4A–4B are fragmented sectional views of the reciprocating floor conveyor of the present invention, including the side seal plates and side seals thereof.

BEST MODE FOR CARRYING OUT THE INVENTION

Figure 4A:
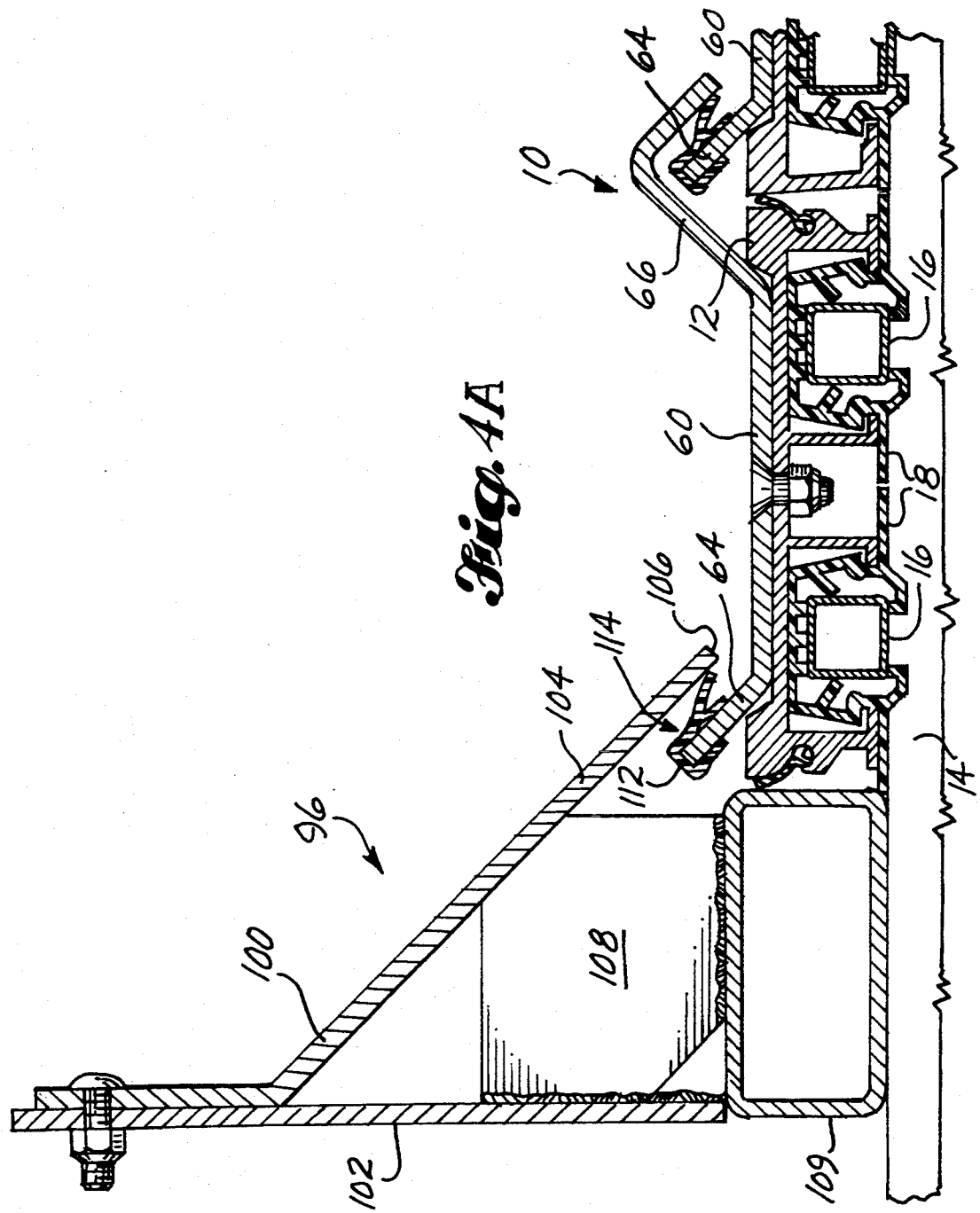

In FIG. 1, a section of the reciprocating floor conveyor 10 of the present invention is shown. Reciprocating floor conveyor 10 includes a plurality of elongated conveyor slats 12. Conveyor slats 12 are mounted on conveyor frame 14 for longitudinal reciprocating movement between "start" and "advanced" positions. My prior U.S. Pat. Nos. 5,064,052, titled, "Reciprocating Conveyor Floor Members and Seals," granted Nov. 12, 1991; 4,962,848, titled, "Reciprocating Floor Conveyor," granted Oct. 16, 1990; and 4,793,469, titled, "Reduced Size Drive/Frame Assembly for a Reciprocating Floor Conveyor," granted Dec. 27, 1988, disclose suitable structure for the conveyor frame bearings and seals, and the sequence of operation of conveyor slats of a reciprocating floor conveyor.

Elongated, one-inch by one-inch guide beams 16 are mounted on conveyor frame 14, as by welding, and extend the length of conveyor 10, except for a section of conveyor 10 wherein a drive mechanism is attached from beneath to conveyor slats 12. My prior U.S. Pat. Nos. 4,712,467, titled, "Combined Linear Hydraulic Motor and Transfer Valve," granted Dec. 15, 1987, and my patent application Ser. No. 08/161,663, titled, "Linear Hydraulic Motor with Snubber," filed Jan. 13, 1994, disclose a drive mechanism suitable for reciprocating conveyor slats 12. Two guide beams 16 are provided for each conveyor slat 12. A pair of plastic snap-on bearings 18 are mounted on each pair of guide beams 16. Conveyor slats 12, in turn, snap on to bearings 18. My prior U.S. Pat. No. 4,785,929, titled, "Bearing System for Reciprocating Floor Conveyor," granted Nov. 22, 1988, discloses a similar type of one-piece snap-on plastic bearing.

Each conveyor slat 12 includes a flat, top portion 22 and a pair of downwardly-depending sidewalls 24, 25. Sidewall 24 includes a lower, inwardly-projecting rail 28, and sidewall 25 includes a lower, inwardly-projecting rail 30. Conveyor slats 12 also include a pair of inner, spaced-apart, and downwardly-depending walls 32, 34. Each inner wall 32, 34 includes a lower rail 36. Rails 28, 30, 36, 36 engage bearings 18 and keep conveyor slats 12 clamped down on guide beams 16 as conveyor slats 12 reciprocate longitudinally across the tops of bearings 18.

Sidewalls 25 each include a ledge 46 for holding a conveyor slat seal 48 in position in a gap 50 between sidewalls 24, 25 of adjacent conveyor slats. Seal 48 is held by ledge 46 to sidewall 25 of one conveyor slat 12, and is biased against sidewall 24 of an adjacent conveyor slat. In this manner, seal 48, between adjacent conveyor slats 12, prevents material from getting down into gap 50.

Each conveyor slat 12 includes a pair of raised side ridges 40, 42. Raised ridges 40, 42 of each conveyor slat 12 are spaced from each other and form a channel 56 for receiving an overlay plate 60. Overlay plate 60 includes a relatively flat central portion 62, a first side edge portion 64 and a second side edge portion 66. First side edge portion 64 is angled upwardly from central portion 62 and terminates laterally at a first side edge 68. Accordingly, first side edge 68 is above central portion 62 of overlay plate 60.

Second side edge portion 66 extends upwardly over first side edge portion 64 of an adjacent overlay plate 60 and terminates at a second side edge 67. Second side edge portion 66 includes an initial segment 70 that is angled upwardly past the first side edge 68 of an adjacent overlay plate 60, and an outward, downwardly-angled segment 72 positioned above first side edge portion 64 of adjacent overlay plate 60.

An elastomeric, somewhat U-shaped overlay seal 78, including a forked end 74, is held in the gap or passageway 76 between outward segment 72 and first side edge portion 64 of an adjacent overlay plate 60. As detailed in FIGS. 2, 3, overlay seal 78 includes a first fork segment 80 biased against outward segment 72, and a second fork segment 81 biased against first side edge portion 64 of adjacent overlay plate 60. Overlay seal 78 also includes a U-shaped tail 84 that mounts snugly around first side edge 68 of overlay plate 60. Preferably, overlay seal 78 is secured to first side edge portion 64 by a suitable mechanical fastener, such as a rivet or series of rivets (not shown). Such fasteners may be spaced from each other along the length of an overlay plate 60.

Passageway 76 is formed by the juxtaposition of outward segment 72 of each overlay plate 60 and first side edge portion 64 of an adjacent overlay plate 60. Passageway 76 is a downwardly-disposed passageway that is sealed from the load carried by the conveyor slats by forked section 74 of overlay seal 78.

Referring back to FIG. 1, overlay plates 60 are secured to conveyor slats 12 by means of bolts 90. For many applications, a single bolt 90 can be used to secure an overlay plate 60 to a conveyor slat 12. However, more than one bolt 90 can be used, if necessary.

The design of the overlap arrangement between overlay plates 60 creates a second level of protection for gaps 50 between conveyor slats 12. In order for material to get down between conveyor slats 12 and into gaps 50, it is necessary for the material to work its way past both overlay seals 78 and conveyor slat seals 48. In addition, overlay seal 78 is positioned in a downwardly-disposed passageway 76, which further limits the extent to which material can get through overlay plates 60.

Referring to FIGS. 4A–4B, the outward side sections 96 of reciprocating floor conveyor 10 are shown to include a formed side seal plate 100 that is secured to a sidewall 102 of a trailer or container, for exampled in which reciprocating floor conveyor 10 is installed. Side seal plates 100 include a downwardly and inwardly-angled section 104 that terminates at a lower inner edge 106. Gussets 108 are provided to support side seal plates 100. Elongated longitudinal box beams 109 are mounted at the corners of the reciprocating floor conveyor 10. Box beams 109 support gussets 108. A side seal 110, similar to conveyor slat seals 48, are provided between the outermost conveyor slat 12 and box beams 109.

Lower inner edges 106 of side seal plates 100 overlie first side edge portion 64 of the left outermost overlay plate 60 and second side edge portion 66 of right outermost overlay plate 60. It should be noted that second side edge portion 66 of outermost overlay plate 60, as detailed in FIG. 4B, only includes an inner upwardly-angled segment 70. A side seal 112 is secured to each side edge portion 64, 66 of outermost overlay plates 60. Side seals 112 are identical in shape to overlay seals 78. Side seals 112 close off gaps or downwardly-disposed passageways 114, which are defined by the juxtaposition of the lower edges 106 of side seal segments 104 and side edge portions 64, 66 of overlay plates 60.

Accordingly, it can be seen that across the width of the reciprocating floor conveyor 10, an additional layer of protection is provided for conveyor slats 12. This additional level of protection includes overlay plates 60, and overlay seals 78 and side seals 112, which seal downwardly-angled passageways defined between the overlay plates and the side seal plates.

Preferably, overlay plates 60 are made of steel, while aluminum is utilized for conveyor slats 12. In addition, steel should be utilized for side seal plates 100.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A reciprocating floor conveyor having a plurality of elongated conveyor slats mounted on a conveyor frame for longitudinal reciprocating movement between start and advanced positions, comprising:

an overlay plate mounted on top of each conveyor slat, each overlay plate having first and second side edge portions terminating laterally at first and second side edges, respectively, and a central portion defined therebetween, the first side edge portion of each overlay plate being angled upwardly so that the first side edge is above the central portion, the second side edge portion extending upwardly over the first side edge portion of the overlay plate mounted on an adjacent conveyor slat, and a seal between the second side edge portion of each overlay plate and the first side edge portion of an adjacent overlay plate.

2. The reciprocating floor conveyor of claim 1, wherein each seal includes a first portion biased against the second side edge portion of an overlay plate and a second portion biased against the first side edge portion of an adjacent overlay plate.

3. The reciprocating floor conveyor of claim 2, wherein each seal is secured to the first side edge portion of an overlay plate.

4. The reciprocating floor conveyor of claim 3, wherein each seal extends around the first side edge of an overlay plate, and a fastener secures each seal to the first side edge portion of an overlay plate.

5. The reciprocating floor conveyor of claim 1, wherein the second side edge portion of each overlay plate includes a downwardly-angled segment spaced from and confronting the upwardly-angled first side edge portion of an adjacent overlay plate, the juxtaposition of the upwardly and downwardly-angled edge portions creates a downwardly-disposed passageway, the seal being positioned in the passageway.

6. The reciprocating floor conveyor of claim 1, and further comprising side seal plates located at the lateral edges of the reciprocating floor conveyor, each side seal plate extending from a sidewall of the reciprocating floor conveyor downwardly and inwardly of the sidewall, each side seal plate including an inner lower edge, which overlies a first or second side edge portion of the overlay plates mounted on top of the outermost conveyor slats.

7. The reciprocating floor conveyor of claim 6, and further comprising a side seal located between the inner lower edge of each side seal plate and a first or second side edge portion of the overlay plates mounted on top of the outermost conveyor slats.

* * * * *